United States Patent
Sina

(10) Patent No.: US 8,285,760 B1
(45) Date of Patent: Oct. 9, 2012

(54) SYSTEM FOR ORGANIZING COMPUTER DATA

(76) Inventor: Parham Sina, Rockville, MD (US)

( * ) Notice: Subject to any disclaimer, the term of this patent is extended or adjusted under 35 U.S.C. 154(b) by 249 days.

(21) Appl. No.: 12/684,924

(22) Filed: Jan. 9, 2010

Related U.S. Application Data

(60) Provisional application No. 61/148,979, filed on Feb. 1, 2009.

(51) Int. Cl.
*G06F 12/00* (2006.01)
*G06F 17/30* (2006.01)

(52) U.S. Cl. ......... 707/824; 707/803

(58) Field of Classification Search .......... None
See application file for complete search history.

(56) References Cited

U.S. PATENT DOCUMENTS

| | | | |
|---|---|---|---|
| 2006/0120224 A1* | 6/2006 | Nakamura et al. | 369/30.3 |
| 2006/0225072 A1* | 10/2006 | Lari et al. | 717/175 |

* cited by examiner

*Primary Examiner* — Tarek Chbouki
(74) *Attorney, Agent, or Firm* — Maier & Maier PLLC

(57) ABSTRACT

A system for organizing computer data by the use of naming rules, grouping rules, and sequencing rules. These rules name and sort data in a consistent and convenient manner, which can, in part or whole, be employed by a human, computer, or both.

2 Claims, 1 Drawing Sheet

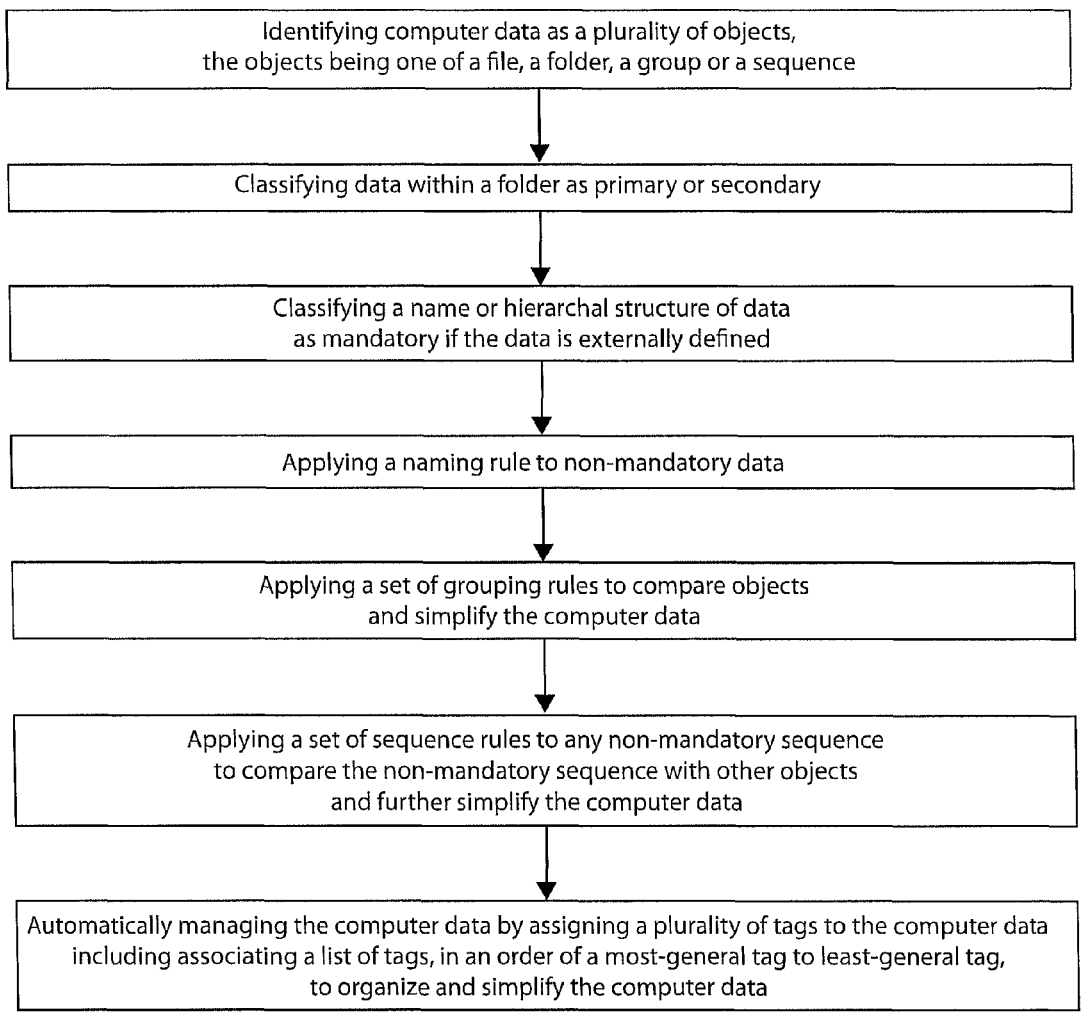

SYSTEM FOR ORGANIZING COMPUTER DATA

CROSS REFERENCE TO RELATED APPLICATIONS

This application claims the benefit of U.S. Provisional Application No. 61/148,979, filed Feb. 1, 2009.

FIELD

This application relates to computers, specifically to the organization of computer data.

ADVANTAGES

This system for organizing computer data allows for consistent and convenient data organization and access both by humans and computers. When data is introduced, it can be logically and predictably organized. When data is organized, it can be accessed readily.

Managing organized data can be less cumbersome and less difficult to sort and navigate through on a database or storage system that would otherwise have no consistent method for data organization.

New data can be determinably named and placed in a computer database or storage system, such as that of a logical disk drive. Naming data such that primary data is discernable from secondary data provides convenience of use.

Software applications could automate data naming and arrangement tasks without the involvement of human interaction.

This system or aspects of it may produce other advantages in addition to these just described, as the logical organization of data can be of innumerable benefits to humans or computers, directly or indirectly.

SUMMARY

This system for organizing computer data provides sets of rules for naming and sorting data in a consistent and convenient manner, which can, in part or whole, be employed by a human, computer, or both. This system consists of a set of naming rules, grouping rules, and sequencing rules. To use this system, a user or computer makes decisions about the data at hand.

BRIEF DESCRIPTION OF FIGURES

FIG. 1 is an exemplary embodiment of a method of organizing computer data.

DESCRIPTION

It is known in the computer art that data is stored in a format known as a "file" within a container known as a "folder." The Microsoft Windows operating systems employ these terms, and they are widely used by the general population. In this specification, the data refers to what are generally known as "files" and "folders." However, this system may apply to any form of data and the logical containers in which they are stored, and its concept may apply to the organization of any subject matter, physical or conceptual.

The user decides on a name for each file and folder, whether multiple files and/or folders constitute a group or sequence, and whether an object is primary or secondary. The user also follows the appropriate rules for sorting the data.

The following sections in this specification consist of definitions of key terms under the heading "Terminology," the system's three sets of rules under the headings "Naming Rules," "Grouping Rules," and "Sequencing Rules," a simplifying processing guide under the heading "Object Conversion Processes;" and a demonstrated example of using the system under the heading "System Demonstration." These are followed by the specification of an application which embodies the System for Organizing Computer Data, consisting of a description under the heading "Data Management Application," extended terminology under the heading "Extended Terminology," the application's three rules under the heading "Application Rules," and a demonstrated example of using the application under the heading "Application Demonstration."

Terminology

The term "data" refers to one or more files, folders, groups, and/or sequences.

The term "object" refers to a file, folder, group, or sequence.

The term "file" refers to a single form of data. The term "folder" refers to a container of data.

When referring to a folder or root level, the term "within" refers only to the immediate path within that folder or root level and not any paths further below in a hierarchy of subfolders.

The term "parent folder" refers to the immediate folder in which data reside. The term "subfolder" refers to the immediate folder which resides within a parent folder or root level. Thus, if a folder contains an object, that folder is a parent folder. If a folder resides within another folder or the root level, it is a subfolder. If an object does not have a parent folder, it is at the top of the structure's hierarchy, or "root level."

The term "group" refers to two or more objects within the same parent folder or root level which can be grouped because they share a more distinct relationship with one another than they do with other data within that parent folder or root level. However, if all objects in that group are members of the same sequence, the term "sequence" is used instead.

The term "sequence" refers to a successive order of two or more objects within the same parent folder or root level. Sequence members are successively prefixed with a sequence number, denoted as [#]-[file or folder name] (i.e. "1-photo" "2-photo" "3-photo").

The terms "primary" and "secondary" are designations applied to data based on the data's relationship with its parent folder. Primary data is the main subject data of its parent folder and secondary data is not. For example, a folder named "apples" contains a file about red apples, a file about green apples, and a file about the author of the other two files. The user decides to designate the red and green apple files as primary, since they are the main subject data of this folder, and the author file as secondary, since it is not the main subject data. The user later introduces another file, which is about apple seeds, to the "apples" folder and designates it as secondary. The user then places the two secondary files within a subfolder and names it "other." Now, the "apples" folder contains three objects: a primary file about red apples, a primary file about green apples, and a secondary folder named "other." Within the "other" subfolder are the author file and seeds file, both of which are now designated as primary since they are the main subject data of their new parent folder which inherited the secondary designation.

A "primary group" is a group of two or more primary or primary and secondary objects within the same parent folder or root level. A "secondary group" is a group of all remaining secondary files and/or folders, if there are two or more, after all primary groups have been formed within the same parent folder or root level. A "primary sequence" is a successive order of two or more primary sequence members within the same parent folder or root level.

A "secondary sequence" is a successive order of two or more secondary sequence members within the same parent folder or root level.

The term "mandatory" refers to either a name or hierarchical structure of data which is externally defined and is not applicable for modification by this system.

1. Naming Rules (with the Exemption of Mandatory Names, One Rule Between a and b Applies and c Always Applies):
   a. Files/folders are named descriptively, more specific than the names of their respective parent folders, if any.
   b. Primary folders which are sequence members or primary files are named identical to the names of their respective parent folders (to the non-sequenced portions, if the parent folders are sequenced).
   c. Files/folders which are sequence members have their names appended to their sequence prefixes.

2. Grouping Rules (with the Exemption of Mandatory Structures, all Rules Apply):
   a. Primary files and/or folders, and optionally one secondary file/folder included, which are both non-grouped and non-sequenced reside within the same parent folder/root level.
   b. A primary group resides within the same parent folder/root level as that of a lone secondary file/folder which is both non-grouped and non-sequenced.
   c. If a group resides within the same parent folder/root level as that of a primary file/folder which is non-grouped and non-sequenced, then the group is contained within a subfolder.
   d. If a secondary group resides within the same parent folder/root level as that of a primary group, then the secondary group is contained within a subfolder.
   e. If two primary groups reside within the same parent folder/root level, then they are each contained within respective subfolders.
   f. If a group member itself constitutes a group/sequence, then the group/sequence is contained within a subfolder.

3. Sequencing Rules (with the Exemption of Mandatory Structures, all Rules Apply):
   a. A primary sequence resides within the same parent folder/root level as that of a lone secondary file/folder which is both non-grouped and non-sequenced.
   b. If a secondary group/sequence resides within the same parent folder/root level as that of a primary sequence, then the secondary group/sequence is contained within a subfolder.
   c. If a sequence resides within the same parent folder/root level as that of a primary file/folder which is both non-grouped and non-sequenced, then the sequence is contained within a subfolder.
   d. If a secondary sequence resides within the same parent folder/root level as that of a primary group, then the secondary sequence is contained within a subfolder.
   e. If a primary sequence resides within the same parent folder/root level as that of a primary group/sequence, then they are each contained within respective subfolders.
   f. If a sequence member itself constitutes a group/sequence, then the group/sequence is contained within a subfolder which has its name prefixed with the sequence number according to the sequence of which it is a member.

Object Conversion Processes:

The following table lists conversion processes of object pairs. Numbers represent primary files/folders and uppercase letters represent secondary files/folders. A single number/uppercase letter represents a single file/folder. Unordered numbers/uppercase letters represent a group. Ordered numbers/uppercase letters represent a sequence. The combination of a number with a lowercase letter, together contained within brackets, represents a group/sequence member which is itself a group/sequence. Numbers/uppercase letters contained within parentheses represent processed containment within a subfolder. Two objects to be compared for processing are connected by a dash, with their state before the processing listed on the left side of the greater-than symbol and their processed state listed on the right side of the greater-than symbol. Following each object conversion process is the referenced rule which describes it.

If more than two objects within the same folder exist, any qualifying pair is compared for simplification processing until all qualifying pairs are simplified. A qualifying pair is one which can simplify by placing one or both pair members within a subfolder.

| Object Conversion Process | Rule |
| --- | --- |
| 5-5 > 5-5 | 2a |
| 5-E > 5-E | 2a |
| 546-E > 546-E | 2b |
| 5-546 > 5-(546) | 2c |
| 5-EDF > 5-(EDF) | 2c |
| 546-EDF > 546-(EDF) | 2d |
| 546-546 > (546)-(546) | 2e |
| 54[6a][6b][6f] > 54(6) | 2f |
| 123-E > 123-E | 3a |
| 123-ABC > 123-(ABC) | 3b |
| 123-EDF > 123-(EDF) | 3b |
| 5-123 > 5-(123) | 3c |
| 5-ABC > 5-(ABC) | 3c |
| 546-ABC > 546-(ABC) | 3d |
| 546-123 > (546)-(123) | 3e |
| 123-123 > (123)-(123) | 3e |
| 12[3a][3b][3f] > 12(3) | 3f |

System Demonstration:

A user has data on an old storage medium and, using this system for organizing computer data, desires to organize it on a new storage medium which currently contains no data. The data to be organized includes school photographs taken from elementary school through college as well as some college assignments.

The user first decides upon a folder in which all the education data is to be stored. According to the naming rules, the user decides whether there is any mandatory name this folder must be given. Since there is not, the user must decide on a descriptive name for this folder since rules 1b and 1c do not apply to it. The user decides to name it "education." The user designates this folder as primary since it is the main subject data stored at the root of this storage medium.

Next, the user would like to distinguish the data between photographs and assignments. According to the naming rules, the user decides that rule 1a applies and descriptively names two folders within the "education" folder "photo" and "assignment." Both folders are primary since they are of equal priority to their parent folder. Before creating any more subfolders, the user would also like to include a document file named "note" which contains notes regarding both the photographs and assignments. Since this file pertains to both the "photo" and "assignment" folders, it resides within the same parent folder "education" alongside them. The user designates this file as secondary since it is not the main subject data of the "education" folder.

At this point, there are three objects within the "education" folder, two which are primary folders and one which is a secondary file. According to rule 2a, as abbreviated in the Object Conversion Processes section, the two folders and one file stay as they are: 5-5 and 5-E.

Note that the user could have chosen to alternatively consider the two primary folders as a group. In this case, according to rule 2b, the two folders and one file would also stay as they are: 546-E. The user has completed organizing the contents of the "education" folder and now begins to work on the "photo" folder.

Within the "photo" folder, the user would like to distinguish the photograph data between the different schools. According to the naming rules, the user decides that rule 1a applies and descriptively names four created primary folders "elementary," "middle," "high," and "college." All of the user's photograph data can be categorized within these folders except for one file which is a document describing various photographs from all the different schools. The user decides that this file is of equal priority to the "photo" parent folder as that of the four folders and designates it as primary. According to the naming rules, the user decides that rule 1b applies and generically names the file "photo." This is because there is no mandatory name this file must be given nor a descriptive name which the user feels would help distinguish it from the parent folder. In this case, the user feels a generic name would describe the file's broad purpose and names it after its parent folder.

At this point, there are five objects within the "photo" folder, all of which are primary. No processing is required as no groups are to be formed between them.

The user has five photograph files of elementary school and, according to the naming rules, decides that rule 1b applies and generically names the primary files "elementary." To distinguish one file from another, they are ordered in sequence by uniquely identifying each as a sequence member. The files are named "1-elementary," "2-elementary," . . . "5-elementary" and placed within the "elementary" folder. The user has completed organizing the contents of the "elementary" folder and now begins to work on the "middle" folder.

The user has seven photograph files of middle school and, according to the naming rules, decides that rule 1b applies and generically names the primary files "middle." To distinguish one file from another, they are ordered in sequence by uniquely identifying each as a sequence member. The files are named "1-middle," "2-middle," . . . "7-middle" and placed within the "middle" folder. Also within the "middle" folder, the user would like to include a document file which contains notes regarding the middle school photographs. According to the naming rules, the user decides that rule 1a applies and descriptively names the secondary file "note."

At this point, there are eight objects within the "middle" folder, seven which are primary and one which is secondary. The next steps would be to consider the seven primary files as a sequence so that they are seen as one object and then process that object against the one secondary object. According to rule 3a, the primary sequence and secondary file stay as they are: 123-E>123-E.

The user now decides to introduce another document file which contains the same text as the note file but is of a different file format. The user decides that rule 1a applies and descriptively names the secondary file "note" as well. In this case, the identically-named "note" files are distinguished by their file extensions.

At this point, there are nine objects within the "middle" folder, seven which are primary and two which are secondary. The next steps would be to again consider the seven primary files as a sequence so that they are seen as one object, consider the two secondary files as a group so that they are seen as one object and then process the two objects against one another. According to rule 3b, the primary sequence and secondary group are processed such that the secondary group is contained within a subfolder: 123-EDF>123-(EDF). The user names this subfolder "note" since it has the same relationship with the parent folder that the two "note" files had. This subfolder also inherits the secondary status from the "note" files. The two "note" files are now primary due to the relationship with their new "note" parent folder, and their names now comply with rule 1b. The current state of objects within the "middle" folder now complies with rule 3a again: 123-E.

The user now decides to introduce a software package within the "note" folder which will display the middle school photographs in a slideshow. The slideshow software package is a prepackaged hierarchy of files and folders, all contained within a single folder named "slideshow," which is a mandatory name. The user decides that this software package is of equal priority to the "note" folder as are the "note" files and designates the "slideshow" folder as primary. Note that the user is also indirectly designating the slideshow software package as secondary to the "middle" folder. Because the data within "slideshow" is a prepared software package in which none of the files and folders can be altered, the user designates all of the internal files and folders collectively as a mandatory structure, each with mandatory names. This means that the location and names of all the files and folders within the hierarchy of the "slideshow" folder are not to be changed. The user is only to be concerned with the processing of the software package's top-level folder, "slideshow."

At this point, there are three objects within the "note" folder, all of which are primary but two of which are distinguished from the third by the user. The next steps would be to consider the two primary "note" files as a group so that they are seen as one object and then process the two objects against one another. According to rule 2c, the primary group and primary folder are processed such that the primary group is contained within a subfolder: 5-546>5-(546).

Note that it is up to the user's judgment as to which file's or folders are to constitute a group. The user decided that the two note files have a more distinct relationship with one another than they do with the "slideshow" folder. The user could just as well have chosen to alternatively consider the two "note" files and "slideshow" folder as three individual, ungrouped primary objects, 5-5-5, and, according to rule 2a, nothing would have changed.

The user has a folder containing two primary "note" files and, according to the naming rules, decides that rule 1b applies and generically names the primary folder "note." However, the user now has two folders named "note," one within the other. Since no naming rule permits a folder which is not a sequence member to be named identical to its parent folder, the user decides that the higher-level "note" folder should be renamed to "extra," according to rule 1a, to more specifically describe its contents now that "slideshow" has been introduced.

At this point, there are two objects within the "extra" folder, both of which are primary. The user now decides to introduce four audio files recorded during various music class lessons at middle school. The user decides that these audio files are not directly related to the photographs and designates them as secondary. The user also decides that rule 1a applies and descriptively names them "audio." To distinguish one audio file from another, they are ordered in sequence by uniquely identifying each as a sequence member. The files are named "1-audio," "2-audio," . . . "4-audio" and placed within the "extra" folder.

At this point, there are six objects within the "extra" folder, two which are primary and four which are secondary. The next steps would be to consider the four audio files as a sequence so that they are seen as one object and then process that object against either of the two single primary objects. According to rule 3c, the secondary sequence and either of the primary folders are processed such that the secondary sequence is contained within a subfolder: 5-ABC>5-(ABC). According to rule 1a, the user names this secondary subfolder "audio." Note that the current state of objects within the "extra" folder now complies with rule 2a: 5-5 and 5-E. Also note that the audio sequence is now primary due to the relationship with its new "audio" parent folder and that its members' names now comply with rule 1b. The user has completed organizing the contents of the "middle" folder and now begins to work on the "high" folder. The user has ten photograph files and one video file of high school and, according to the naming rules, decides that rule 1b applies and generically names the primary files "high." To distinguish one photograph file from another, they are ordered in sequence by uniquely identifying each as a sequence member. The files are named "1-high," "2-high," . . . "10-high" and placed within the "high" folder. The video file is named "high" and also placed within the "high" folder.

At this point, there are eleven objects within the "high" folder, all of which are primary. The next steps would be to consider the ten photograph files as a sequence so that they are seen as one object and then process the two objects against one another. According to rule 3c, the primary sequence and primary file are processed such that the primary sequence is contained within a subfolder: 5-123>5-(123). According to rule 1a, the user names this primary subfolder "snapshot." The user places the ten photograph files within the "snapshot" folder and renames the primary files to "1-snapshot," "2-snapshot," . . . "10-snapshot," according to rule 1b, since they are the main subject data of the "snapshot" folder, and according to rule 1c, since they are sequence members.

At this point, there are two objects within the "high" folder, both of which are primary. The user decides to rename the video "high" to "video," according to rule 1a, so as to describe it more specific than its parent folder, as was done with the "snapshot" folder. This avoids later confusing the "snapshot" folder as being secondary or less important.

The user now decides to include two document files within the "snapshot" folder, one containing notes regarding the "3-snapshot" sequence member and one containing notes regarding the "5-snapshot" sequence member. The user would like each secondary note file to be organized with its respective sequence member. Each pair of files constitutes a primary group which, according to rule 3f, is processed to be contained within its own subfolder, have the same respective sequence number prefixed to its name and, according to rule 1b, be named generically after its parent folder: 12[3a][3b][3f]>12(3). In each primary subfolder, "3-snapshot" and "5-snapshot," are two files. One is the primary file which, according to rule 1b, is renamed generically as "snapshot," having its prefix removed. The other is the secondary file which, according to rule 1a, is named descriptively as "note."

Note that the concept behind the object conversion process 12[3a][3b][3f]>12(3) is that of introducing data which must incorporate with a sequence. In such an instance, the target sequence must disassemble to its individual file and/or folder members for comparison so that each target member can be grouped or sequenced with the new data. In this case, when the sequence was disassembled, each group was either processed against a primary file, according to rule 2c: 5-546>5-(546), or each other, according to rule 2e: 546-546>(546)-(546). In either case, the groups were placed in subfolders which became the new single sequence members and the sequence could reassemble.

The user has completed organizing the contents of the "high" folder and now begins to work on the "college" folder.

The user has twelve photograph files of college, six of which are of the associate program and six of which are of the bachelor program. According to the naming rules, the user decides that rule 1a applies to all the files and descriptively names the six primary associate program files sequentially as "1-associate," "2-associate," . . . "6-associate" and the six primary bachelor program files sequentially as "1-bachelor," "2-bachelor," . . . "6-bachelor."

At this point, there are twelve objects within the "college" folder, all of which are primary. The next steps would be to consider each set of six sequence members as a sequence so that they are seen as two objects and then process them against one another. According to rule 3e, the primary sequences are processed such that each sequence is contained within its own subfolder: 123-123>(123)-(123).

The user creates two folders to contain the two sequences and, according to the naming rules, decides that rule 1a applies and descriptively names the primary folders "associate" and "bachelor," similar to the names of their respective files. The primary files within these two folders now comply with naming rule 1b since they are generically named after their respective parent folders, appended to their sequence prefixes.

The user now decides to introduce a sequence of three photograph files of the master's program within a primary "master's" folder to be placed within the "college" folder. The user decides that rule 1a applies and descriptively names the three primary sequence members "1-beginning semester," "2-mid semester," and "3-graduation." The user has completed organizing the contents of the "photo" folder and now begins to work on the "assignment" folder.

At this point, the "assignment" folder is about to be populated with data. The user has master's thesis, programming, and math data to be placed within their respective subfolders. According to the naming rules, the user decides that rule 1a applies and descriptively names these three primary subfolders "master's thesis," "programming," and "math."

The user's master's thesis exists in the form of both a document and diagram file. The user places these files within the "master's thesis" folder. According to the naming rules, the user decides that rule 1b applies to the document file and generically names it "master's thesis," designating it as primary. The user then decides that rule 1a applies to the diagram file and descriptively names it "diagram." designating it as primary. The user feels that, while both files are to be considered primary, the document file is more important and chooses to indicate such by naming only it after the parent folder.

The user now decides to introduce a sequence of two rough drafts of the diagram within the "master's thesis" folder. The user decides that rule 1a applies and descriptively names the two secondary sequence members "1-draft" and "2-draft."

At this point, there are four objects within the "master's thesis" folder, two which are primary and considered a group by the user, and two which are secondary. According to rule 3d, the primary group and secondary sequence are processed such that the secondary sequence is contained within a subfolder: 546-ABC>546-(ABC). The user decides that rule 1a applies and descriptively names the secondary folder "draft." The sequence within the "draft" folder is now designated as primary. The user has completed organizing the contents of the "master's thesis" folder and now begins to work on the "programming" folder.

The user's programming project exists in the form of an executable file, source code file, and configuration file, all of which are to be designated as a primary group. In addition, a flow chart file and note file are to be supplemented, both of which are to be designated as secondary. All primary and secondary files are initially placed within the "programming" folder.

At this point, there are five objects within the "programming" folder, three which are primary and two which are secondary. According to the naming rules, the user decides that rule 1a applies to all the files and descriptively names the three primary files "executable," "source code," and "configuration" and the two secondary files "flow chart" and "note." According to rule 2d, the two groups are processed such that the secondary group is contained within its own subfolder: 546-EDF>546-(EDF). According to the naming rules, the user decides that rule 1a applies to the secondary subfolder and descriptively names it "extra." "flow chart" and "note" become primary since they are the main subject data of the "extra" folder.

The user now decides to include two additional configuration files within the "programming" folder as part of the primary group which resides there. The user would like the three primary configuration files to be organized as a sequence, renaming "configuration" as "1-configuration" and naming the other two configuration files as "2-configuration" and "3-configuration."

The three configuration files constitute a primary sequence which, according to rule 2f, is processed such that it is contained within its own subfolder which, according to rule 1a, is named descriptively as "configuration" and designated as primary: 54[6a] [6b][6f]>54(6).

Note that the concept behind the object conversion process 54[6a][6b][6f]>54(6) is that of introducing data which must incorporate with a group. In such an instance, the target group must disassemble to its individual file and/or folder members for comparison so that each target member can be grouped or sequenced with the new data. In this case, when the group was disassembled, the sequence was processed against a primary file, according to rule 3c: 5-123>5-(123). The sequence was placed in a subfolder which became the new single group member and the group could reassemble.

The user has completed organizing the contents of the "programming" folder and now begins to work on the "math" folder.

The user's math projects consist of objects of various types: E-E-E-5-EDF-123-ABC-E. The user begins by grouping E-E-E-5, closely-related objects, as a primary group. Note that a primary group may contain secondary objects so as to contain all relevant sub-objects. Secondary groups cannot be formed until all primary groups have been formed so as to collect their respective secondary objects. 546-EDF-123-ABC-E remains. Note that the E-E-E-5 has converted to 546.

Next, the user processes 123-ABC, according to rule 3b: 123-(ABC). 546-EDF-123-E-E remains. The user then processes 546-123, according to rule 3e: (546)-(123). 5-EDF-5-E-E remains. The user then processes 5-EDF, according to rule 2c: 5-(EDF). 5-E-5-E-E remains.

Because the only primary group has been formed, E-E-E can be grouped as a secondary group so as to consolidate all remaining secondary objects, resulting in 5-5-EDF.

Next, the user processes 5-EDF, according to rule 2c: 5-(EDF). 5-5-E remains, which is the final result as it cannot be simplified further. The user has completed organizing the contents of the "math" folder and returns to the root level.

Next, the user introduces various new objects at the root level unrelated to education, validating the existence of the "education" folder. The user has completed organizing the contents of the new storage medium.

Data Management Application:

This System for Organizing Computer Data may be applied to a data management application so that it may be automated. One such application is managing files and folders through the use of tags. Tags are symbols, such as words or numbers, associated with files and folders, assigned by a user or computer, so that those files and folders may be accessed based on those tags. A user, for example, could query all files related to red apples by indicating the "apple" and "red" tags as search values and each relative file or folder with these assigned tags in its tag list could be retrieved.

This data management application can be mapped systematically to the hierarchical structures of files and folders using the System for Organizing Computer Data. This mapped tagging system could facilitate automatic file and folder manipulation such that a user need not be concerned with the manual process of organizing such data. A user could take advantage of the simpler data management capability of the tagging system, where data could be either recovered by searching with tags or entered by assigning tags, as opposed to manually deciding how to name and organize such data. Also, because this tagging system would be tied to a logically-consistent data storage mechanism, a user could opt to navigate and manage the processed data hierarchies intimately.

This data management application must map to the hierarchical system if it is to manipulate it according to the System for Organizing Computer Data. The user associates a list of tags, in order of most-general to least-general, with each file. A folder with a mandatory structure may be handled similarly, although this description will only refer to manually-tagged files. Each file tag list defines file and folder naming and placement. Folders are created and tagged automatically. Each mutable tag list is mirrored to each of the file and folder hierarchies. For example, if the tags for a .txt file which is about green apple seeds is "apple," "green," and "seed," in that order, then the file would be named "seed" which would be placed within a folder named "green" within a folder named "apple," using the syntax "apple\green\seed.txt."

If a folder ends up containing no data, it is removed. If a folder ends up containing only one file or folder, that file or folder would come out of its parent folder and the parent folder would be removed. When a tag list for a file contains tags which are unnecessary so as to avoid creating folders containing only one file or folder, the file would be named as though its original, or immutable tag list were shortened, called a retracted mutation. If a file or folder has a sequence prefix because it is a sequence member, the sequence prefix would cause an extended mutation in its associated tag list. If a file and folder which are peers, being within the same folder or root level, have the same name because the file's immutable tag list and folder's inherited tag list are identical, then the file is placed in that folder and its tag list is extended to include the new parent folder's tag, causing the file to be considered super primary among its new peers which are not also super primary like itself. Those peers, collectively seen as secondary to the super primary file, are then placed in a subfolder which is tagged with a common tag, concatenated if more than one tag finds commonality. A concatenated tag causes an extended mutation in their tag lists.

Two tag lists are maintained for each file. A mutable tag list facilitates an extended and/or retracted hierarchical data structure while an immutable tag list facilitates proper processing against peer tag lists.

When a file is introduced, its immutable tag list will first be matched with any existing hierarchical structure. For example, if a .txt file is tagged "apple," "green," and "stem" and placed on a storage medium with an existing "apple\green\seed.txt" tag-listed file, then the introduced file would be named "stem" and placed within the "green" folder: "apple\green\stem.txt." The match is made from the beginning of the path on inward. If the introduced file was to have the tags "green" and "stem" only, in that order, it would be placed in a different path: "green\stem.txt." In this case, the file might be considered by the user to have no relevance with apples.

Extended Terminology

A "tag" is a word attribute assigned to a file by a user or to a folder inheritably.

A "tag list" of a file includes all tags assigned to it in their prescribed order of most-general to least-general. Folders inherit tags and tag lists based on their position in the hierarchy. Tag lists map to file and folder hierarchies where each file and folder consists of a tag list specifying its name and location.

An "immutable tag list" is the original, unchanging tag list of a file. Immutable tag lists comprise of only a single instance of each tag.

A "mutable tag list" is the extended or retracted mutation of a file's tag list and is always subject to change. File and folder structures map directly to mutable tag lists. File extensions are neither considered mutable nor immutable. They only specify the file type, such as a text (.txt) or graphic (.png) file. This description will not consider the possibility of identically-named files with identical file extensions conflicting within the same path.

An "extended mutation" of a file's tag list exists when a file is placed in a folder where it is considered super primary, when a folder groups a super primary sequence member, when a file or folder is appended a sequence prefix, or when a folder is made up of a tag concatenation.

A "retracted mutation" of a file's tag list exists when an excess of immutable tags are unnecessary because their corresponding folders contain only one object and the file to which the tag list belongs can be renamed with a higher-level tag.

A "super primary" consideration is applied to the extended mutation of a file's tag list where a file is placed within a subfolder which has the same tag name, sequenced or not, as the file's immutable tag name, so as to be contained with other peer files which use its tag as a grouping or sequencing parent folder. It is considered super primary so as to distinguish its primary status among all its peers which are not also super primary. Folders which group a super primary sequence member inherit the super primary designation among their peers. Without the presence of a super primary file or folder, those peer files and folders would be compared as primary and secondary between themselves and grouped and/or sequenced accordingly from the folder in which they reside. With the presence of a super primary file or folder, however, peer files and folders which are not also super primary are collectively considered secondary to it and grouped or sequenced as necessary. If there is only one secondary file or folder, it is named after its highest available tag. If there is more than one secondary file or folder, they are collectively placed in a subfolder named after their highest available common tag. If no single common tag is available for them, a concatenated tag of their highest available common and uncommon tags is formed.

A "tag concatenation" occurs when a super primary file or folder causes a group to be formed between objects which, in total, have no single available tag in common, causing the shared subfolder in which they are to be placed to be tagged with all of their highest-available tags concatenated. Within a concatenated folder, super primary files cannot exist and thus concatenation cannot occur. When a concatenated tag member is no longer required, its portion is removed from all mutable tag lists using it. Concatenated tags are separated by a dash.

Application Rules:
1. Immutable tag availability is distributed among peer files and/or folders based on their primary or secondary statuses. A file or folder with higher status receives a higher-level available tag. Extended mutations are not considered for comparison. If two files which do not have identical immutable tag lists are equally qualified based on their statuses to access a particular tag to be named after, neither of them can be named after it and they must be distinguished by their next available tag down the list.
2. Within any given folder or the root level, all file instances of identical immutable tag lists must collectively form a single group or sequence, unless such instances are within a sequenced folder based off the same immutable tag list, in which case they must collectively form a single group only.
3. A secondary file to a sequenced tag is specified by the user as to whether or not it belongs to a sequence member and, if so, which one. The secondary file may become part of a new sequence member, resulting in the formation of a sequenced parent folder when there are peers.

Application Demonstration:

A mutable tag list mirrors the file and folder hierarchy for a file. Files are indicated with a file extension. Extended mutations are underlined. Tag lists with retracted mutations have their immutable tag lists displayed alongside in parenthesis. Newly-introduced tag lists in the RESULT sections are indicated with a greater-than symbol. The following examples demonstrate existing tag lists of their corresponding existing files which are added to with new tag lists of new files to process a result based on the rules from the System for Organizing Computer Data. The Object Conversion Process symbol is included with the START AND RESULT headings.

Example 1

Start 5
   orange.txt
Add
   apple.txt
Result 5-5
   orange.txt
   >apple.txt
Note: The two tag lists, each containing only one tag, are primary peers.
   Add
   grape\red.txt
Result 5-5
   orange.txt
   apple.txt
   >grape.txt (grape\red.txt)

Note: The three tag lists are primary peers and the new tag list consists of a retracted mutation using the highest available tag "grape." "red" was omitted because a "grape" folder would have only contained a single "red" file, causing that "red" file to come out of its folder.
Add
   grape\green.txt
Result 5-(546)
   orange.txt
   apple.txt
   grape\red.txt
>grape\green.txt
Note: The "grape" folder groups its two files and "grape\red.txt" is no longer retracted. "grape\red.txt" must give up the "grape" tag to the parent folder.
SUBTRACT orange.txt apple.txt grape\red.txt
Result 5
   grape.txt (grape\green.txt)
Note: The "grape" folder is no longer required to contain the two "grape" files. Also, the "grape" tag is now available.
Add
   grape\red.txt
Result 5-5
   green.txt (grape\green.txt)
>red.txt (grape\red.txt)
Note: The higher-level "grape" tag cannot be assigned to the files because they are equally qualified to access it. They each must use the next available tag down the list so as to distinguish themselves.

Example 2

Start 546-E orange.txt
   apple\red.txt
   apple\red.png
   apple\skin.txt (apple\red\skin.txt)
Add
   apple\red\seed.png
RESULT 546-(EDF) orange.txt apple\red.txt apple\red.png
   apple\skin-seed\skin.txt (apple\red\skin.txt)
>apple\skin-seed\seed.png (apple\red\seed.png)
Note: The secondary files are grouped and their subfolder is named after each member's available tag, forming a tag concatenation. The concatenation occurred because their common "red" tag is already used by the group of higher status. Note that a super primary file cannot exist within the concatenated folder since it cannot represent a concatenation as a whole.
Add
   apple\green.txt
Result 5-(546)
   orange.txt
   apple\red\red.txt
   apple\red\red.png
   apple\red\skin-seed\skin.txt
   apple\red\skin-seed\seed.png
>apple\green.txt
Note: The "red" group folder is formed so as to distinguish its members from the "green" peer tag. The "red.txt" and "red.png" files are now a super primary extended mutation.
Add
   apple\green.txt
Result 5-(123)
   orange.txt
   apple\red\red.txt
   apple\red\red.png
   apple\red\skin-seed\skin.txt
   apple\red\skin-seed\seed.png
   apple\green\1-green.txt
>apple\green\2-green.txt
Note: Because an identical tag list is introduced, a sequence is opted by the user to be formed. A "green" folder groups its sequence members. With this configuration, all additional identical tag lists must become sequence members if they are to be placed within the "green" folder. Here; within the "apple" folder is 54[6a][6b][6f], where the "green" group member forms a sequence. Had an "apple\golden" sequence been introduced simultaneously, within the "apple" folder would be (123)-(123) as well.

Example 3

Start 5-5 orange.txt
   apple.txt
Add
   apple\red.txt
Result 5-(546)
   orange.txt
   apple\apple.txt
>apple\red.txt
Note: The "apple.txt" tag list is now mutable, with the "apple" tag extended into a subfolder to be grouped with "apple\red.txt."
Add
   apple\red\seed.txt
Result 5-
   (EDF) orange.txt
   apple\apple.txt
   apple\red\red.txt
>apple\red\seed.txt
Note: "apple\red.txt" and "apple\red\seed.txt" are grouped in the "red" subfolder as they are collectively seen as a secondary group to the "apple.txt" super primary peer. Here, the secondary group actually consists of a primary and secondary file, but these files are not processed against one another until they are grouped within their own subfolder. The "red" tag was available for the subfolder name, so no tag concatenation was required to describe its contents. Within the "apple" folder is now 5-E and "red.txt" is now super primary to "seed.txt" since it extends from the parent folder.
Add
   apple\red.txt
RESULT 123-E orange.txt apple\apple.txt apple\red\1-red.txt
>apple\red\2-red txt
   apple\red\seed.txt
Note: Because an identical tag list is introduced, a sequence is opted by the user to be formed.
Add
   apple\red.png
Result 123-E
   orange.txt
   apple\apple.txt
   apple\red\1-red.txt
   apple\red\2-red.txt
>apple\red\3-red.png
   apple\red\seed.txt
Note: The new file must become part of the sequence because first it must be sent into the "red" folder to become super primary, and then because only one of either a group or sequence for the "apple\red" immutable tag list may exist within any given folder and a sequence has already been formed within this one.
Add
   apple\red\skin.txt
Result 123-(EDF)
   orange.txt
   apple\apple.txt
   apple\red\1-red.txt
   apple\red\2-red.txt
   apple\red\3-red.png
   apple\red\seed-skin\seed.txt
>apple\red\seed-skin\skin.txt
Note: The group is concatenated since no common tags are available.
Add
   apple\red\skin\vitamin.txt
Result 5-(546)
   orange.txt
   apple\apple.txt
   apple\red\1-red.txt
   apple\red\2-red.txt
   apple\red\3-red.png
   apple\red\seed-skin\seed.txt
   apple\red\seed-skin\skin\skin.txt
>apple\red\seed-skin\skin\vitamin.txt
Note: A subfolder is formed for the "apple\red\skin" group and the extended mutation produces a super primary "skin.txt" file. Here, within the "seed-skin" folder is 54[6a][6b][6f], where the "skin" group member forms a group. Had a "seed" group member been introduced simultaneously, within the "seed-skin" folder would be (546)-(546). Had a "seed" sequence member been introduced simultaneously, within the "seed-skin" folder would be (546)-(123).
Add
   apple\red\note.txt
Result 12[3a][3b][3f]
   orange.txt
   apple\apple.txt
   apple\red\1-red.txt
   apple\red\2-red\red.txt
>apple\red\2-red\note.txt
   apple\red\3-red.png
   apple\red\seed-skin\seed.txt
   apple\red\seed-skin\skin\skin.txt
   apple\red\seed-skin\skin\vitamin.txt
Note: The user decides to associate the file with "2-red." Here, within the "red" folder is 12[3a][3b][3f], where the "2-red" sequence member forms a group. Since folders which group a super primary sequence member inherit the super primary designation, the "apple\red\2-red" folder becomes super primary while "apple\red\2-red\red.txt" continues to use the extended tag.
Subtract
   apple\red\skin.txt
   apple\red\skin\vitamin.txt
Result 123-E
   orange.txt
   apple\apple.txt
   apple\red\1-red.txt
   apple\red\2-red\red.txt
   apple\red\2-red\note.txt
   apple\red\3-red.png
   apple\red\seed.txt Note: The concatenation is no longer required and "apple\red\seed.txt" is restored to its immutable form.
Add
   apple\red\seed.png
Result 123-(ABC)
   orange.txt
   apple\apple.txt
   apple\red\1-red.txt
   apple\red\2-red\red.txt
   apple\red\2-red\note.txt
   apple\red\3-red.png
>apple\red\seed\1-seed.png
   apple\red\seed\2-seed.txt
Note: First the user is opted to have the file either join one of the "red" sequence members or have it form a group or sequence with the identically-tag-listed "seed.txt" file. The user decides the latter and then opts to join it as the first sequence member.
Add
   apple\red\seed.txt
Result 12[3a][3b][3f]
   orange.txt
   apple\apple.txt
   apple\red\1-red\red.txt
>apple\red\1-red\seed.txt
   apple\red\2-red\red.txt
   apple\red\2-red\note.txt
   apple\red\3-red.png
   apple\red\seed\1-seed.png
   apple\red\seed\2-seed.txt
Note: The user directs the file to join the "1-red" sequence member.
Add
   apple\red\seed.txt
Result 5-(ABC)
   orange.txt
   apple\apple.txt
   apple\red\1-red\red.txt
   apple\red\1-red\seed\1-seed.txt
>apple\red\1-red\seed\2-seed.txt
   apple\red\2-red\red.txt
   apple\red\2-red\note.txt
   apple\red\3-red.png
   apple\red\seed\1-seed.png
   apple\red\seed\2-seed.txt
Note: The user directs the file to join the "1-red" sequence member and form a secondary sequence. Had another "red" super primary group member resided within the "1-red" folder, within the "1-red" folder would be 546-(ABC).
Add
   apple\red\seed\ovule.txt
   RESULT 12[3a][3b][3f] orange.txt apple\apple.txt apple\red\1-red\red.txt
   apple\red\1-red\seed\1-seed\seed.txt
>apple\red\1-red\seed\1-seed\ovule.txt
   apple\red\1-red\seed\2-seed.txt
   apple\red\2-red\red.txt
   apple\red\2-red\note.txt
   apple\red\3-red.png
   apple\red\seed\1-seed.png
   apple\red\seed\2-seed.txt
Note: The user directs the file to join the "1-seed" sequence member of the "1-red" sequence member to form a group.
Subtract
   apple\red\1-red\red.txt
Result 12[3a][3b][3f]
   orange.txt
   apple\apple.txt

```
apple\red\1-red\1-seed\seed.txt
apple\red\1-red\1-seed\ovule.txt
apple\red\1-red\2-seed.txt
apple\red\2-red\red.txt
apple\red\2-red\note.txt
apple\red\3-red.png
apple\red\seed\1-seed.png
apple\red\seed\2-seed.txt
```
Note: The "apple\red\1-red\seed" folder is no longer required and its members come out. Here, within the "apple\red" folder is 12[3a][3b][3f], where the "1-red" sequence member forms a sequence.

Add
```
    apple\red\seed\ovule.txt
```
Result 123-E
```
    orange.txt
    apple\apple.txt
    apple\red\1-red\1-seed\seed.txt
    apple\red\1-red\1-seed\ovule.txt
    apple\red\1-red\2-seed.txt
    apple\red\2-red\red.txt
    apple\red\2-red\note.txt
    apple\red\3-red.png
    apple\red\seed\1-seed.png
    apple\red\seed\2-seed.txt
>apple\red\seed\ovule.txt
```
Note: The user directs the file to be independent of any current sequence member along its path.

Add
```
    apple\red\seed\ovule.png
```
Result 123-E
```
    orange.txt
    apple\apple.txt
    apple\red\1-red\1-seed\seed.txt
    apple\red\1-red\1-seed\ovule.txt
    apple\red\1-red\2-seed.txt
    apple\red\2-red\red.txt
    apple\red\2-red\note.txt
    apple\red\3-red.png
    apple\red\seed\1-seed.png
    apple\red\seed\2-seed.txt
    apple\red\seed\3-seed\ovule.txt
>apple\red\seed\3-seed\ovule.png
```
Note: The user directs the file to become part of a new "seed" sequence member, then assigning "ovule.txt" to that sequence member as well, resulting in the formation of a sequenced parent folder to contain the peer "ovule" files.

I claim:

1. A method of organizing computer data, said method implemented by a computer configured to perform the steps of:
   identifying said computer data as a plurality of objects, each object being at least one of a file, a folder, a group or a sequence wherein:
     a file is a single form of data;
     a folder is a container of data, wherein a folder is either a parent folder or a subfolder, wherein a folder containing at least one object is a parent folder, a folder residing within another folder is a subfolder, and wherein any object not contained within a parent folder or subfolder is at a root level;
     a group is two or more objects within the same parent folder or at the same root level that share a distinct relationship with one another as compared to other objects within the same parent folder or root level; and
     a sequence is a successive order of two or more objects within the same parent folder or root level;
   classifying data within a folder as primary if the data is a main subject of its parent folder, or secondary if the data is not a main subject of its parent folder;
   classifying a name or hierarchal structure of data as mandatory if the data is externally defined;
   applying a naming rule to non-mandatory data, the naming rule comprising:
     (a) naming a file or folder that is a member of a sequence such that the name is associated with a sequence identifier;
   applying a set of grouping rules to compare objects of a non-mandatory group and simplifying the objects by placing one or both objects within a subfolder, the grouping rules comprising:
     (a) placing a first primary file or folder and a second primary file or folder or secondary file or folder, which are both non-grouped and non-sequenced within a same parent folder or root level;
     (b) placing a primary group within a same parent folder or root level as that of a lone secondary file or folder which is both non-grouped and non-sequenced;
     (c) placing a group within a subfolder if the group resides within a same parent folder or root level as that of a non-grouped and non-sequenced primary file or folder;
     (d) placing a secondary group within a subfolder if the secondary group resides in a same parent folder or root level as that of a primary group;
     (e) placing a first primary group and a second primary group within respective subfolders if the first primary group and the second primary group reside within a same parent folder or root level; and
     (f) placing a group member within a subfolder if the group member itself constitutes a group or sequence;
   applying a set of sequence rules to any non-mandatory sequence to compare the non-mandatory sequence with other objects and simplify the objects by placing the at least one non-mandatory sequence or other objects within a subfolder, the sequencing rules comprising:
     (a) placing a primary sequence within a same parent folder or root level as that of a lone secondary file or folder which is non-grouped and non-sequenced;
     (b) placing a secondary group or sequence within a subfolder if the secondary group or sequence resides within a same parent folder or root level as that of a primary sequence;
     (c) placing a sequence in a subfolder if the sequence resides within a same parent folder as that of a primary file or folder which is non-grouped and non-sequenced;
     (d) placing a secondary sequence in a subfolder if the secondary sequence resides within the same parent folder or root level as that of a primary group;
     (e) placing a first primary sequence and a second primary sequence, or a primary sequence and a primary group in respective subfolders if the first and second primary sequences or the primary sequence and primary group reside within a same parent folder or root level; and
     (f) placing a sequence member in a subfolder if the sequence member itself constitutes a group or sequence, wherein the subfolder has a name associated with a sequence number according to the sequence of which it is a member;

automatically managing the computer data by assigning a plurality of tags to the computer data, wherein:
- a tag is a word attribute associated with a file or folder;
- a tag list includes all tags assigned to a file or folder in a prescribed order of most-general to least-general, wherein tag lists map to a file or folder hierarchy where each file or folder includes a tag list specifying a name and location, wherein folders inherit tags and tag lists based on their position in the hierarchy;
- an immutable tag list is an original, unchanged tag list of a file with only a single instance of each tag;
- a mutable tag list is an extended or retracted mutation of a file's tag list;
- an extended mutation of a file's tag lists exists when a file is considered super primary, when a folder groups a super primary sequence member, when a file or folder is appended a sequence prefix, or when a folder is made up of a tag concatenation;
- a retracted mutation of a file's tag list exists when an excess of immutable tags are deemed unnecessary because corresponding folders contain only one object and the file to which the tag list belongs can be renamed with a higher-level tag;
- a super primary consideration is applied to an extended mutation of a file's tag list where a file is placed within a subfolder which has the same tag name as the file's immutable tag name so as to be contained with a plurality of peer files which use the tag as a grouping or sequencing parent folder; and
- a tag concatenation occurs when a super primary file or folder causes a group to be formed between objects which together do not share an available tag in common, causing a shared subfolder in which the objects are to be placed to be tagged with all of the objects' highest-available tags concatenated;

associating a list of tags, in an order of a most-general tag to least-general tag, with each file and folder;
maintaining both an immutable and mutable tag list for each file;
creating a file and folder hierarchy based on each file's mutable tag list;
processing the computer data according to the grouping rules and sequencing rules;
attempting to match an immutable tag list of a new file with an existing hierarchical structure, starting from the beginning of an immutable tag list path on downward, so as to determine said new file's placement;
distributing immutable tags among peer files and folders based on the primary or secondary statuses of said files and folders, and assigning a higher-level available tag to said files and folders with a higher status, and further assigning sequence members which are retracted secondary files a tag of the sequence;
extending the mutable tag list of a file when necessary and naming files and folders so as to accommodate a recovery of a retracted mutation with the addition of said folder, or to accommodate an extended mutation with the addition of a sequence identifier, super primary status, or tag concatenation;
retracting a mutable tag list of a file when necessary and naming files and folders so as to accommodate a recovery of an extended mutation with the removal of a sequence identifier, super primary status, or tag concatenation, or to accommodate a retracted mutation with the removal of a folder;
removing an empty folder;
moving a lone file within a parent folder out of said parent folder and removing said parent folder;
moving contents of a peerless parent folder out of said parent folder and removing said parent folder;
applying the super primary consideration to an extended mutation of a file's tag list;
placing a file within a folder which has an inherited tag list based on said file's immutable tag list, or if said folder is also a sequence member or contains a sequence based on said immutable tag list, placing said file as a new sequence member alongside said sequence or said contained sequence, or within any new or existing member folder of either of said sequences, and extending said file's tag list to include any new parent folder's tag;
refusing to name any of a file and folder, two files, or two folders, which do not have identical immutable tag lists, after a particular tag which said pair members are equally qualified to access based on said pair members' respective statuses, and instead distinguishing said pair members by said pair members' next available tags down the respective tag lists of said pair members;
forming a single group or sequence of all file instances of identical immutable tag lists within any given folder or root level, unless said instances are within a sequenced folder based on said immutable tag list, in which case said instances form said single group only;
directing a secondary file to a sequenced tag to either become a new sequence member, resulting in the formation of a sequenced parent folder when an additional file joins said sequence member, or part of an existing sequence member.

2. The method of claim 1, further comprising the steps of:
applying a naming rule to said data, unless said data is classified as mandatory, the naming rules comprising:
(a) naming files and folders descriptively, more specific than a names of said any respective parent folder;
(b) naming primary files, or primary folders which are sequence members, identical to a name of a respective parent folder, and only to the non-sequenced portions of said names if said parent folders' names include sequencing information.

* * * * *

UNITED STATES PATENT AND TRADEMARK OFFICE
CERTIFICATE OF CORRECTION

| | |
|---|---|
| PATENT NO. | : 8,285,760 B1 |
| APPLICATION NO. | : 12/684924 |
| DATED | : October 9, 2012 |
| INVENTOR(S) | : Parham Sina |

It is certified that error appears in the above-identified patent and that said Letters Patent is hereby corrected as shown below:

On the front page item (74) please delete "Maier & Mair PLLC" and please insert
--Maier & Maier PLLC--

Signed and Sealed this
Twenty-fifth Day of December, 2012

David J. Kappos
*Director of the United States Patent and Trademark Office*